No. 658,233. Patented Sept. 18, 1900.
P. C. CAMPBELL.
WHEEL.
(Application filed Mar. 28, 1900.)
(No Model.)
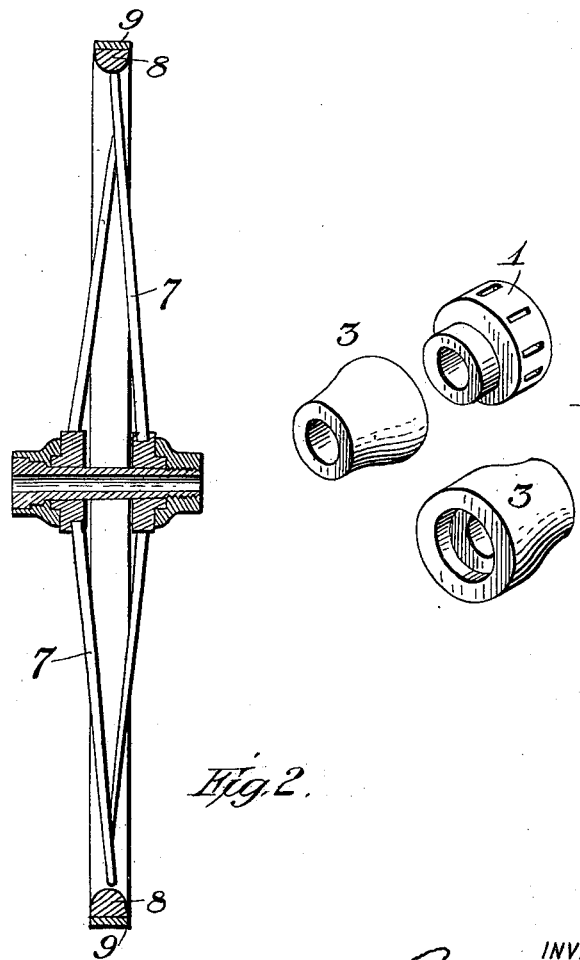
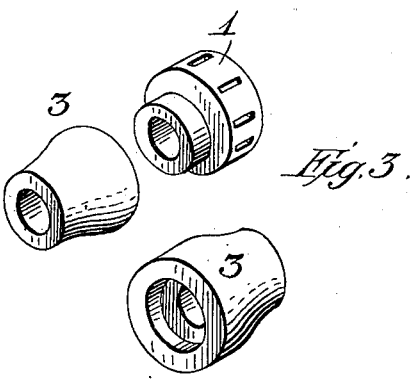
WITNESSES:
INVENTOR
Peter C. Campbell,
BY John A. Sail
ATTORNEY

UNITED STATES PATENT OFFICE.

PETER C. CAMPBELL, OF McCASKILL, SOUTH CAROLINA.

WHEEL.

SPECIFICATION forming part of Letters Patent No. 658,233, dated September 18, 1900.

Application filed March 28, 1900. Serial No. 10,504. (No model.)

*To all whom it may concern:*

Be it known that I, PETER C. CAMPBELL, a citizen of the United States, residing at McCaskill, in the county of Chesterfield and State of South Carolina, have invented certain new and useful Improvements in Wheels, of which the following is a specification.

My invention relates to wheels, and more particularly to a means for tightening the tires of the same.

In the drawings forming a part of this specification, and in which like symbols of reference represent corresponding parts in the several views, Figure 1 is a view of the sections composing the hub and axle-box. Fig. 2 is a vertical section of the wheel, and Fig. 3 is a further view of the sections of the hub.

The hub is composed of the central pieces or spoke-sections 1 and 2, the side piece 3, and the piece 4.

5 is the axle-box, having screw-threads 6 on one end and ribs 7 formed on its other end.

7 are the spokes, 8 the felly, and 9 the tire, of the wheel.

The operation of the device is as follows: The piece 1 is first placed upon the axle-box, then piece 2, then 3, and finally section 4. Said section 4 being internally screw-threaded is screwed upon the axle-box, forcing the spokes of the wheel outwardly, tightening the felly and tire of the wheel.

Having now fully described my invention, what I claim as new, and desire to secure by Letters Patent, is—

In a wheel, the combination with the socketed spoke-sections, of an axle-box to receive the same, threads formed on one end of said axle-box and a flange on its other, flanges formed on the spoke-sections, hub-sections adapted to be received upon the axle-box and embrace the spoke-sections, recesses in the hub-sections to receive the flanges of the spoke-sections, and threads formed upon one of the hub-sections adapted to engage the threads on the box and compress the sections, substantially as described.

In testimony whereof I affix my signature in presence of two witnesses.

PETER C. CAMPBELL.

Witnesses:
W. B. GAY,
J. C. BLACKWELL.